(12) United States Patent
Stokes et al.

(10) Patent No.: US 8,530,586 B2
(45) Date of Patent: *Sep. 10, 2013

(54) METHOD FOR PREPARING POLYOLEFINS CONTAINING A HIGH PERCENTAGE OF EXO-OLEFIN CHAIN ENDS

(75) Inventors: Casey D. Stokes, Novato, CA (US); Kelby Simison, Marysville, CA (US); Robson F. Storey, Hattiesburg, MS (US); James J. Harrison, Novato, CA (US)

(73) Assignees: Chevron Oronite Company LLC, San Ramon, CA (US); The University of Southern Mississippi, Hattiesburg, MS (US)

( * ) Notice: Subject to any disclaimer, the term of this patent is extended or adjusted under 35 U.S.C. 154(b) by 581 days.

This patent is subject to a terminal disclaimer.

(21) Appl. No.: 12/767,672

(22) Filed: Apr. 26, 2010

(65) Prior Publication Data

US 2010/0311913 A1 Dec. 9, 2010

Related U.S. Application Data

(63) Continuation of application No. 11/207,264, filed on Aug. 19, 2005, now Pat. No. 7,705,090.

(60) Provisional application No. 60/603,422, filed on Aug. 20, 2004.

(51) Int. Cl.
*C08F 214/02* (2006.01)

(52) U.S. Cl.
USPC ..................................... 525/331.4

(58) Field of Classification Search
USPC ........................................ 525/375
See application file for complete search history.

(56) References Cited

U.S. PATENT DOCUMENTS

| | | |
|---|---|---|
| 3,155,686 A | 11/1964 | Prill et al. |
| 3,632,600 A | 1/1972 | Morris et al. |
| 4,034,038 A | 7/1977 | Vogel |
| 4,152,499 A | 5/1979 | Boerzel et al. |
| 4,238,628 A | 12/1980 | Cahill et al. |
| 4,255,538 A | 3/1981 | Skillicorn |
| 4,276,394 A | 6/1981 | Kennedy et al. |
| 4,342,849 A | 8/1982 | Kennedy |
| 4,393,199 A | 7/1983 | Manser |
| 4,468,291 A | 8/1984 | Naarmann et al. |
| 4,486,572 A | 12/1984 | Kennedy |
| 4,568,732 A | 2/1986 | Kennedy et al. |
| 4,758,631 A | 7/1988 | Kennedy et al. |
| 4,814,405 A | 3/1989 | Kennedy |
| 4,910,321 A | 3/1990 | Kennedy et al. |
| 4,929,683 A | 5/1990 | Kennedy et al. |
| 4,943,616 A | 7/1990 | Mishra et al. |
| 4,946,899 A | 8/1990 | Kennedy et al. |
| 4,948,936 A | 8/1990 | Landry |
| 5,032,653 A | 7/1991 | Cheradame et al. |
| 5,066,730 A | 11/1991 | Kennedy et al. |
| 5,112,507 A | 5/1992 | Harrison |
| 5,122,572 A | 6/1992 | Kennedy et al. |
| 5,169,914 A | 12/1992 | Kaszas et al. |
| 5,175,225 A | 12/1992 | Ruhe, Jr. |
| 5,219,948 A | 6/1993 | Storey et al. |
| 5,225,492 A | 7/1993 | Kennedy et al. |
| 5,286,823 A | 2/1994 | Rath |
| 5,300,701 A | 4/1994 | Cherpeck |
| 5,334,321 A | 8/1994 | Harrison et al. |
| 5,336,745 A | 8/1994 | Cheradame et al. |
| 5,340,881 A | 8/1994 | Kennedy et al. |
| 5,350,786 A | 9/1994 | Costanzi et al. |
| 5,350,819 A | 9/1994 | Shaffer |
| 5,395,885 A | 3/1995 | Kennedy et al. |
| 5,428,111 A | 6/1995 | Faust et al. |
| 5,444,135 A | 8/1995 | Cheradame et al. |
| 5,448,000 A | 9/1995 | Gullapalli et al. |
| 5,451,647 A | 9/1995 | Faust et al. |
| 5,464,549 A | 11/1995 | Sieberth |
| 5,466,745 A | 11/1995 | Fiori et al. |
| 5,488,000 A | 1/1996 | Zhang et al. |
| 5,506,316 A | 4/1996 | Shaffer |
| 5,580,935 A | 12/1996 | Shaffer |
| 5,616,668 A | 4/1997 | Harrison et al. |
| 5,629,394 A | 5/1997 | Cheradame et al. |
| 5,637,647 A | 6/1997 | Faust |
| 5,663,457 A | 9/1997 | Kolp |
| 5,663,470 A | 9/1997 | Chen et al. |

(Continued)

FOREIGN PATENT DOCUMENTS

| | | |
|---|---|---|
| DE | 237072 | 7/1986 |
| DE | 240308 | 10/1986 |

(Continued)

OTHER PUBLICATIONS

Bae et al. Macromolecules, 30, 7341-7344(1997).*
Bae et al., "β-Portion Elimination by Free bases in the Living Carboncationic Polymerization of Isobutylene," Macromolecules, 30, 7341-7344, 1997.
Bae et al., "The Role of Pyridine Derivatives in Living Carbocationic Polymerization: Lewis Base or Nucleophile?" Macromol. Symp. 132, 11-23, 1998.
Bauer, R. F.; LaFlair, R. T.; Russell, K.E. Can. J. Chem., 48, 1251, 1970.
Bauer, R. F.; Russell, K. E. J. Poly. Sci., A-1(9), 1451, 1971.
Bezumnova et al. Khim Geterosikl. Soedin. 80, 194, 1971.
Boileau, S.; Mazeaud-Henri, B.; Blackborow, R. European Polymer Journal, 39, 1395-1404, 2003.

(Continued)

*Primary Examiner* — Ling Choi
*Assistant Examiner* — Lanee Reuther
(74) *Attorney, Agent, or Firm* — Jones Day

(57) ABSTRACT

The present invention is directed to a method for preparing polyolefins containing a high percentage of exo-olefin chain ends. The method involves ionizing a polyolefin containing tert-chloride chain ends and reacting the ionized polyolefin with one or more nitrogen-containing five-membered aromatic ring or one or more hindered secondary or tertiary amines, or mixtures thereof.

37 Claims, No Drawings

(56) References Cited

U.S. PATENT DOCUMENTS

| | | | |
|---|---|---|---|
| 5,677,386 A | 10/1997 | Faust | |
| 5,690,861 A | 11/1997 | Faust | |
| 5,777,044 A | 7/1998 | Faust | |
| 5,945,491 A | 8/1999 | Matyjaszewski et al. | |
| 5,948,936 A | 9/1999 | Itoh et al. | |
| 6,033,446 A | 3/2000 | Cherpeck et al. | |
| 6,194,597 B1 | 2/2001 | Faust et al. | |
| 6,407,066 B1 | 6/2002 | Dressen et al. | |
| 6,451,920 B1 | 9/2002 | Harrison et al. | |
| 6,468,948 B1 | 10/2002 | Rossi et al. | |
| 6,515,083 B2 | 2/2003 | Ozawa et al. | |
| 6,642,318 B1 | 11/2003 | Chiefari et al. | |
| 6,753,391 B1 | 6/2004 | Lewandowski et al. | |
| 6,818,716 B2 | 11/2004 | Wendland et al. | |
| 6,906,011 B2 | 6/2005 | Harrison et al. | |
| 6,969,744 B2* | 11/2005 | Stokes et al. | 525/375 |
| 7,071,275 B2 | 7/2006 | Rath et al. | |
| 7,124,110 B1 | 10/2006 | Kemp, II et al. | |
| 7,420,019 B2 | 9/2008 | Stokes | |
| 7,501,476 B2 | 3/2009 | Stokes | |
| 7,705,090 B2* | 4/2010 | Stokes et al. | 525/375 |
| 2002/0082367 A1 | 6/2002 | McConville et al. | |
| 2002/0132905 A1 | 9/2002 | Babinee et al. | |
| 2003/0105194 A1 | 6/2003 | Stuart et al. | |
| 2003/0162858 A1 | 8/2003 | Faust et al. | |
| 2003/0191257 A1 | 10/2003 | Wettling et al. | |
| 2004/0015029 A1* | 1/2004 | Lange et al. | 585/521 |
| 2004/0260033 A1 | 12/2004 | Stokes et al. | |
| 2005/0282972 A1 | 12/2005 | Stokes et al. | |
| 2006/0041081 A1 | 2/2006 | Stokes et al. | |
| 2006/0041083 A1 | 2/2006 | Stokes et al. | |
| 2006/0041084 A1 | 2/2006 | Stokes et al. | |
| 2006/0135721 A1 | 6/2006 | Lange et al. | |
| 2006/0264577 A1 | 11/2006 | Faust et al. | |
| 2007/0155908 A1 | 7/2007 | Stokes et al. | |
| 2007/0155910 A1 | 7/2007 | Stokes | |
| 2007/0155911 A1 | 7/2007 | Stokes et al. | |
| 2009/0247716 A1 | 10/2009 | Stokes | |

FOREIGN PATENT DOCUMENTS

| | | |
|---|---|---|
| DE | 253827 | 2/1988 |
| DE | 262028 | 11/1988 |
| DE | 262233 | 11/1988 |
| DE | 266104 | 3/1989 |
| DE | 282697 | 9/1990 |
| DE | 296283 | 11/1991 |
| DE | 296284 | 11/1991 |
| DE | 296285 | 11/1991 |
| DE | 296286 | 11/1991 |
| EP | 0206756 A2 | 12/1986 |
| EP | 0255181 A1 | 2/1988 |
| EP | 0342792 A1 | 11/1989 |
| EP | 0397081 A2 | 11/1990 |
| EP | 0400844 A1 | 12/1990 |
| EP | 0341012 B2 | 12/1992 |
| EP | 0959096 A1 | 11/1999 |
| EP | 1209170 A1 | 5/2002 |
| EP | 1489109 A2 | 12/2004 |
| GB | 1 159 368 | 7/1969 |
| GB | 2 184 738 | 7/1987 |
| JP | 2001172567 A | 6/2001 |
| SU | 293 804 A | 1/1971 |
| WO | WO 90/05711 | 5/1990 |
| WO | WO 94/13706 | 6/1994 |
| WO | WO 97/19962 A1 | 6/1997 |
| WO | WO9909074 * | 2/1999 |
| WO | WO 00/75202 A1 | 12/2000 |
| WO | WO 02/06359 A1 | 1/2002 |
| WO | WO 02/48215 A1 | 6/2002 |
| WO | WO 03/106390 A1 | 12/2003 |
| WO | WO 2006/110647 A1 | 10/2006 |

OTHER PUBLICATIONS

De. P.; Faust, R. ACS Div. Polym. Chem., Polym. Preprs., 46, 847, 2005.

Diaz, A. F.; Castillo, J. I. J. Chem. Soc., Chem. Comm, 397, 1980.

Diaz, A. F.; Kanazawa, K. K. J. Chem. Soc., Chem Comm., 635, 1979.

Evsyukov et al., "Chemical dehydrohalogenation of halogen-containing polymer", Russian Chemical Reviews, 60(4), 373-390, 1991.

Faust, R., Kennedy, J. P. J. Macromol. Sci.—Chem., A27(6), 649-667, 1990.

Fodor et al., "Synthetic Applications of Non-Polymerizable Monomers in Living Carbocationic Polymerizations", ACS Div. Polym. Chem., Polym. Preprs., 35(2), 492-493, 1994.

Gardini, G. P. Adv. Heterocyl. Chem., 15: 67-98, 1973.

Gonzales de la Campa, J., Pham, Q. Makromol. Chem., 182, 1415, 1981. (English Abstract).

Gorski, U.; Maenz, K., Stadermann, D. Die Angewandte Makromolekulare Chemie, 253, 51-64, 1997.

Hadjikyriacou, et al., "Living Coupling Reaction in Living Cationic Polymerization. 4. Synthesis of Telechelic Polyisobutylenes Using Bis-Furanyl Derivatives as Coupling Agents", JMS PureApplChem, A37, 1333-52, 2000.

Hadjikyriacou, S.; Faust, R. Macromolecules, 32, 6394-6399, 1999.

Hadjikyriacou, S.; Faust, R. Macromolecules, 33, 730-733, 2000.

Hamley, "Block Copolymers", Encyclopedia of Polymer Science and Technology,457-482, Mar. 2003.

Higashihara et al., Macromolecules, 39, 5275, 2006.

Ipatieff, V. N; Pines, H.; Friedman, B.S. J. Am. Chem. Soc. 60, 2731, 1938.

Ivan et al., "Living carbocationic polymerization. XXX. One-pot synthesis of allyl-terminated linwar and tri-arm star polyisobutylenes, and epoxy-and hydroxy-telechelics therefrom", J. Polym. Sci.: Part A: Polym. Chem., 28, 89-104, 1990.

Ivan et al., "New telechelic polymers and sequential copolymers by polyfunctional initiator-transfer agents (inifers)", J. Poly. Chem. Ed., 18, 3177-3191, 1980.

Kaszas, G.; Puskas, J. E.; Chen, C. C.; Kennedy, J.P.; Polymer Bulletin (Berlin), 20(5), 413-19, 1988.

Keki et al., "Dimethyldioxirane as a New and Effective Oxidation Agent for the Epoxidation of a,w-Di(isobutenyl)polyisobutylene: A convenient Synthesis of a,w-Di(2-methyl-3-hydroxypropyl)-polyisobutylene", J. Poly. Sci. A Poly. Chem., 40, 3974-3986, 2002.

Kennedy et al., "New Telechelic Polymers and Sequential Copolymers by Polyfunctional Initiator-Transfer Agents (Inifers)", Polym. Bull., 9, 27-32, 1983.

Kennedy, J. P., Chang, V. S. C., Smith, R. A., Ivan, B. Polymer Bulletin, 1, 575-580, 1979.

Kennedy, J. P.; Guhaniyogi, S.C.; Percec, V. Poly. Bull., 8, 563-570, 1982.

Kennedy, J.P.; Hayashi, A. Journal of Macromolecular Science, Chemistry, A28(2), 197-207.

Kim, I and Faust, R. Journal of Macromlecular Science Part A—Pure and Applied Chemistry. A40(10), 991-1008, 2003.

Klemm et al. Angew Makromol. Chem., 207, 187, 1993. (English Abstract).

Klemm, E.; Bell, U. Polym. Bull. (Berlin) 28, 653, 1992.

Koroskenyi, B.; Faust, R. J.M.S.—Pure Appl. Chem., A36(12), 1879-1893, 1999.

Lenz, "Organic Chemistry of Synthetic High Polymers," (Section 7.2) Interscience Publishers, New York, p. 196, 1967.

Li, J.; Sung, S.; Tian, J.; Bergbreiter, D.E. Tetrahedron, 61, 12081-12092, 2005.

Machl et al., "Novel Synthetic Routes to Aminofunctionalized Polyisobutylenes", ACS Div. Polym. Chem. Polym. Preprs., 44(2), 858-859, 2003.

Maenz, K., Mollhoff, M., Stadermann, D. Acta Polymerica, 47(5), 208-213, 1996.

Maenz, K., Stadermann, D. Angewandte Makromolekulare Chemie, 242, 183-197, 1996.

Maenz, K., Stadermann, D. Angewandte Makromolekulare Chemie, 258, 69-73, 1998.

Martinez-Castro, N.; Lanzendo, M. G.; Muller, A. H.E. Cho, J.C.; Acar, M. H.; Faust, R. Macromolecules, 36, 6985-6994, 2003.

Mishra, M.K.; Sar-Mishra, B.; Kennedy, J. P. Poly. Bull., 16, 47-53, 1982.

Morgan, C. R.; Magnotta, F.; Ketley, A. D. J. Polym. Sci. Polym. Chem. Ed., 15, 627, 1977.

Nemes et al., "Oxyethylation and Carbonation of Telechelic Polyisobutylene Anions", Poly. Bull. 24, 187-194, 1990.

Nielsen, L.V., Nielsen, R.R.; Bo, G.; Kops, J.; Ivan, B. Polymer, 38(10), 2529-2534, 1997.

Nuyken, O.; Reuschel, G.; and Siebzehnrubl. Makromol. Chem. Macromol. Symp, 26, 313, 1989.

Nuyken, O.; Volkel, T. Makromol. Chem. Rapid Commun. 11, 365, 1990.

Nuyken, O; Chang, V. S. C.; Kennedy, J. P. Polym. Bull. (Berlin), 4, 61-65, 1981.

Puskas et al. J. Polymer Sci: Symposium No. 56, 191.

Rooney, J. M. J. Appl. Poly. Sci., 25, 1365-1372, 1980.

Roth, M.; Mayr, H. Macromolecules, 29, 6104-6109, 1996.

Sawamoto et al., "End Functionalized Polymers by Living Cationic Polymerization", Macromolecules, 20(1), 1-6, 1987.

Schriescheim, A.; Kirshenbaum, 1. Chemtech, 310, 1978.

Serniuk, G.E.; Banes, F. W.; Swaney, M. W. J. Am. Chem. Soc. 70, 1804, 1948.

Si, Jiaoshi; Kennedy, J.P., Polymer Bulletin (Berlin) 33(6), 651-6, 1994.

Simison et al., "End-Quenching of Quasiliving Carbocationic Isobutylene Plymerization with Hindered Bases: Quantitative Formation of Exo-Olefin-Terminated Polyisobutylene," Macromolecules, 39(7), 2481-2487.

Stacey et al. Org. React, 13, pp. 150-208 and 233-333, 1963.

Storey. R. F.; Stokes, C. D.; Harrison, J. J. Macromolecules, 38(11), 4618-4624, 2005.

Ummadisetty et al., "Rapid Communication: Quantitative Syntheses of Novel Polyisobutylenes Fitted with Terminal Primary —Br, —Oh, —NH$_2$ and Methacrylate Termini", J. Poly. Sci. A Poly. Chem., 46, 4236-4242, 2008.

Wallace et al., "Intelligent Polymer Systems", Encyclopedia of Polymer Science and Technology, 231-250, Jul. 2004.

Wollyung et al., "Intelligent Polymers Systems", J. Poly. Sci. A Poly. Chem., 43, 946-958, 2005.

Zinger et al, J. Am. Chem. Soc. vol. 106, 6861-6863, 1984.

Notice of Allowance mailed May 11, 2005, U.S. Appl. No. 10/600,898.

Office Action mailed Apr. 1, 2008, U.S. Appl. No. 11/186,157.

Office Action mailed Oct. 20, 2008. U.S. Appl. No. 11/186,157.

Office Action mailed Feb. 20, 2009, U.S. Appl. No. 11/186,157.

Office Action mailed Nov. 12, 2008, U.S. Appl. No. 11/207,366.

Notice of Allowance mailed Aug. 7, 2009, U.S. Appl. No. 11/207,366.

Office Action mailed Mar. 23, 2007, U.S. Appl. No. 11/207,377.

Office Action mailed Jan. 2, 2008, U.S. Appl. No. 11/207,377.

Office Action mailed Jan. 8, 2009, U.S. Appl. No. 11/356,490.

Office Action mailed Aug. 31, 2009, U.S. Appl. No. 11/356,490.

Office Action mailed Dec. 5, 2008, U.S. Appl. No. 11/357,562.

Office Action mailed Aug. 7, 2009, U.S. Appl. No. 11/357,562.

Office Action mailed May 13, 2008, U.S. Appl. No. 11/359,491.

Notice of Allowance mailed Dec. 3, 2008, U.S. Appl. No. 11/356,491.

Office Action mailed Nov. 12, 2008, U.S. Appl. No. 11/207,264.

Notice of Allowance mailed Aug. 6, 2009, U.S. Appl. No. 11/207,264.

Notice of Allowance mailed Dec. 10, 2009, U.S. Appl. No. 11/207,264.

\* cited by examiner

METHOD FOR PREPARING POLYOLEFINS CONTAINING A HIGH PERCENTAGE OF EXO-OLEFIN CHAIN ENDS

This application is a continuation application of U.S. application Ser. No. 11/207,264, which was filed Aug. 19, 2005 now U.S. Pat. No. 7,705,090 and claims the benefit of U.S. Provisional Application No. 60/603,422, filed Aug. 20, 2004.

FIELD OF THE INVENTION

The present invention is directed to a method for preparing polyolefins containing a high percentage of exo-olefin chain ends. The method involves ionizing a polyolefin containing tert-chloride chain ends and reacting the ionized polyolefin with one or more nitrogen-containing five-membered aromatic ring or one or more hindered secondary or tertiary amines, or mixtures thereof.

BACKGROUND OF THE INVENTION

Linear polyolefins made using a mono-functional initiator containing a single "exo-olefin", "di-substituted" olefin, or "methyl vinylidene group," end group are useful precursors for the preparation of polymers containing specific functional end groups. Polymers made using multi-functional initiators would have multiple exo-olefinic end groups. Polymers containing specific end groups are useful as lubricating oil additives. One example of a functionalized polymer containing hetero atoms is polyisobutenylsuccinic anhydride. Functional end groups may also be desirable for making polymers with potential for further reactions.

Conventional ionic polymerizations can be anionic or cationic. Anionic polymerizations proceed, in the presence of a base, through carbanions and favor monomers having electron withdrawing groups. Cationic polymerizations proceed, in the presence of an acid, through a carbocation, also called a carbenium ion, and favor monomers that have electron releasing groups.

Similarly to the conventional polymerization systems, living polymerization systems may be either anionic or cationic. The difference between conventional polymerizations and living polymerizations is that an ideal living polymerization proceeds in the absence of chain transfer and chain termination. Living polymerization systems are of great commercial importance because the degree of polymerization may be controlled by controlling the feed ratio of monomer to initiator and sequential addition of two or more different monomers affords the ability to produce block copolymers. Polymerization continues until the monomer is exhausted, but the polymers retain their ability to add additional monomers any time in the future. A number of such systems are well known in the art.

A further development is the cationic quasi-living polymerization systems using conventional monomers. Quasi-living polymerization requires certain restrictive conditions, for example anhydrous reagents. Cationic quasi-living polymerizations differ from truly living polymerizations in that, although the rate of chain transfer approaches zero, chain termination is present but reversible. One important example of a cationic quasi-living polymerization is the cationic quasi-living polymerization of isobutylene.

Typically, cationic quasi-living polymerizations of isobutylene yield narrow molecular weight distribution and one major polymer product containing the 2-chloro-2-methylpropyl end group, also referred to as the "tert-chloride" end group. Under certain conditions minor amounts of olefinic isomers may also be produced.

On the other hand, there are two major olefinic isomers produced during conventional polymerization of isobutylene with $BF_3$, for example, the highly reactive exo-olefin isomer and the relatively unreactive 2-methyl-1-propenyl isomer, also referred to as the "tri-substituted" isomer or "endo olefin" isomer. Furthermore, conventional polymerizations of isobutylene yield polymers with broad molecular weight distributions or polydispersity indices.

Exclusive production of the exo-olefin isomer has not been previously achieved under conventional polymerization conditions for isobutylene.

There are two established methods for producing polyisobutylene containing only the exo-olefin end group. One method involves chemical dehydrohalogenation of tert-chloride terminated polyisobutylene using potassium tert-butoxide in a post polymerization reaction (U.S. Pat. No. 4,342, 849). The other method involves in situ quenching of quasi-living isobutylene with methallyltrimethylsilane, which converts an active, living carbenium ion to the exo-olefin end group. (M. Roth and H. Mayr, *Macromolecules*, 29, 6104, 1996)

Polyisobutylene polymers containing more than one exo-olefin end group may be prepared using the above methods by the use of a multi-functional initiator.

The preparation of polyolefins, including polyisobutylene polymers, is well known in the art. A number of patents have discussed processes for making polyisobutylene polymers containing exo-olefin end groups, but none using reacting an ionized polyolefin with a nitrogen-containing five-membered aromatic ring compound or a hindered secondary or tertiary amine.

European Patent No. 341012 discloses a method for producing polymers with narrow molecular weight distribution, where the ratio of the weight average molecular weight, M(w), to the number average molecular weight, M(n), approaches 1.

U.S. Pat. No. 4,152,499 discloses isobutene polymers having a mean degree of polymerization from 10 to 100 and where the proportion of theoretically possible terminal double bonds is greater than in conventional products. The patent also discloses the method of making the isobutene polymers using boron trifluoride as the initiator.

U.S. Pat. No. 4,342,849 discloses the synthesis of polyisobutylene carrying either unsaturation or hydroxyl groups at both ends, in the case of a linear polymer, or at all ends in the case of a star polymer. The method involves the steps of refluxing a solution of telechelic di-halogen polyisobutylene, adding a solution strong base such as potassium t-butoxide and stirring to form the telechelic di-olefin polyisobutylene.

U.S. Pat. No. 4,393,199 discloses a method for carrying out cationic polymerization with molecular weight control in which a pre-initiator and a catalyst effective for cationic polymerization are mixed with a monomer. The resulting living polymer is then treated as desired.

U.S. Pat. No. 4,758,631 discloses a method of preparing allyl-terminated polyisobutylene by allylation with allyltrimethylsilane of tertiary chloro-capped polyisobutylene by electrophilic substitution. The synthesis begins with the boron trichloride catalyzed mono- or oligo-tertiary chloride "inifer" initiated polymerization of isobutylene, followed in the same reaction vessel by the addition of hexane, allyltrimethylsilane and titanium tetrachloride.

U.S. Pat. Nos. 4,910,321 and 5,122,572 disclose a catalyst composed of a complex of an organic acid or its ester and a Lewis acid; preferably boron trichloride that can add olefin monomers to increase the molecular weight of the complex from as low as 200 to in excess of a million. The patents also disclose polymers of different molecular weights having useful end groups such as halogens and specifically chloride, allyl, acryl or methacryl, acetate or formate.

U.S. Pat. Nos. 4,929,683 and 5,066,730 disclose a catalyst composed of a complex of an organic ether and a Lewis acid, preferably boron trichloride that can add olefin monomers to increase the molecular weight of the complex from as low as 200 to in excess of a million. The patents also disclose polymers of different molecular weights having useful end groups such as halogens and specifically chloride, allyl, acryl or methacryl, acetate or formate.

U.S. Pat. No. 5,219,948 discloses a method for preparing elastomeric polymers comprising alpha-olefins or conjugated alkadienes by cationic polymerization in the presence of titanium tetrachloride and an electron pair donor selected from pyridine or a non-hindered alkylpyridine. The polymers have very narrow, mono-modal molecular weight distribution.

U.S. Pat. No. 5,336,745 discloses a method for the direct synthesis of polymeric materials functionalized with desirable nitrogen-containing functional groups such as terminal azido, cyano, carbonylamino or thiocarbonylamino groups. Polymerization and functionalization occur in a substantially simultaneous manner.

U.S. Pat. No. 5,428,111 discloses a process for the living polymerization of aromatic, preferably styrenic monomers initiated from a living polyolefin, particularly polyisobutylene, chain end for making block copolymers having polyolefin mid-blocks and styrenic end-blocks.

U.S. Pat. No. 5,448,000 discloses a one-pot method of preparing sulfonic acid-terminated polyisobutylene by sulfonation with acetyl sulfate of a living polyisobutylene in a single step. The method involves "inifer" initiated carbocationic polymerization with Lewis acid to form the polymer followed by the sulfonation.

U.S. Pat. Nos. 5,637,647 and 5,677,386 disclose the capping of a living polymer with one or more capping compounds comprising non-polymerizable monomer selected from a group consisting of substituted or unsubstituted diphenyl alkylene, methoxystyrene, trans-stilbene, 1-isopropenyl-naphthalene and 2,4-dimethyl styrene.

U.S. patent application Ser. No. 10/433,439, Publication No. 2004/0015029 A1, discloses a process for the preparation of polyisobutylenes in which at least 60 percent of the polymer chains have at least one olefinically unsaturated terminal group, by cationic polymerization of isobutene or isobutene-containing monomer mixtures in the condensed phase and in the presence of an initiator system.

U.S. patent application Ser. No. 10/600,898, Publication No. 2004/0260033 A1, discloses the method for manufacturing and producing monodisperse telechelic polymers through cationic polymerization of suitable monomer under living polymerization conditions and quenching the polymerization with an N-substituted-pyrrole. The functionalized polymers containing N-substituted-pyrroles may be employed as fuel additives and/or lubricating oil additives.

PCT International Application No. PCT/EP/05472, International Publication No. WO99/09074, discloses a process for functionalizing polymers prepared by cationic polymerization wherein a living carbocationic polymerization system is reacted with one or more aromatic ring systems, and the use of substituted or unsubstituted reaction products of said process in lubricating oil or fuel compositions and additive concentrates, for example as dispersants, detergents or antioxidant additives or VI improvers.

β-*Proton elimination by Free Bases in the Living cationic Polymerization of Isobutylene*, by Young Cheol Bae and Rudolf Faust, Macromolecules, Volume 30, 7341-7344 (1997). The authors investigated β-proton elimination from quasi-living polyisobutylene, after observing exo-olefin formation in the presence of 2,6-di-tert-butylpyridine (DTBP) of low purity. They ascribed elimination to the presence of a sterically hindered cyclic imine base present in the DTBP in a concentration of $6 \times 10^{-6}$ moles per liter. They simulated this impurity using 2-tert-butylpyridine (TBP) and discovered that the latter, when added to the reactor at the start of the polymerization (i.e., in the presence of monomer) resulted in about 65 percent elimination after 3 hours of reaction time to produce exclusively exo-olefin. When the extent of elimination had reached 20 percent or higher, significant coupling was observed from both $^1$H NMR and GPC analyses. Bae and Faust clearly considered that elimination by sterically hindered bases, such as TBP, was undesirable and should be avoided. The first paragraph of the paper was summarized as follows: "Finally, strong bases may also eliminate β-protons, which should be avoided." Later, they refer to the cyclic imine base impurity in DTBP as "the culprit." Finally, they summarized the entire paper by saying that the elimination process should be avoided for polymer preparation purposes, although it might facilitate the measurement of kinetic rate constants: "While β-proton elimination should be avoided for the synthesis of well-defined macromolecules, if diffusion control of this process can be shown, it may provide a novel method of establishing the concentration of active centers, from which absolute propagation rate constants could be calculated."

SUMMARY OF THE INVENTION

The present invention is directed to a method for preparing polyolefins containing a high percentage of exo-olefin chain ends. The method involves ionizing a polyolefin containing terminal tert-chloride chain ends and reacting the ionized polyolefin with one or more nitrogen-containing five-membered aromatic ring compounds or one or more hindered secondary or tertiary amines, or mixtures thereof.

More specifically, the present invention is directed to a method for preparing a polyolefin product containing exo-olefin chain ends on the polyolefin polymer chain, which method comprises:

(a) ionizing a polyolefin containing terminal tert-chloride chain ends on the polymer chain in the presence of a Lewis acid; and (b) reacting the ionized polyolefin with one or more nitrogen-containing five-membered aromatic ring compounds selected from pyrroles and imidazoles having at least two hydrocarbyl substituents on the ring, or one or more hindered secondary or tertiary amines containing only carbon, hydrogen, and nitrogen atoms, or mixtures thereof, provided the nitrogen containing five-membered aromatic ring is not:
(i) 2,4-dimethylpyrrole;
(ii) 2-phenylindole;
(iii) 2-methylbenzimidazole;
(iv) 1,2-dimethylimidazole;
(v) 2-phenylimidazole; and
(vi) 2,4,5-triphenylimidazole;
and provided the hindered secondary or tertiary amines are not:
(i) Triethylamine;
(ii) Tri-n-butylamine;
(iii) Trihexylamine;

(iv) Triisooctylamine;
(v) 2-phenylpyridine;
(vi) 2,3-cyclododecenopyridine;
(vii) Di-p-tolylamine;
(viii) Quinaldine; and
(ix) 1-pyrrolidino-1-cyclopentene;

to thereby obtain the polyolefin product containing exo-olefinic end groups on the polyolefin polymer chain.

Preferably the polyolefin is polyisobutylene.

Preferably steps (a) and (b) are independently carried out at a temperature in the range of from about −130° C. to about 10° C. More preferably steps (a) and (b) are independently carried out at a temperature in the range of from about −80° C. to about 0° C. Yet more preferably steps (a) and (b) are independently carried out at a temperature in the range from about −70° C. to about −10° C. Most preferably steps (a) and (b) are independently carried out at a temperature in the range from about −60° C. to about −20° C.

In one embodiment of the above method the one or more nitrogen-containing five-membered aromatic ring compounds in step (b) is a substituted-pyrrole having the general formula:

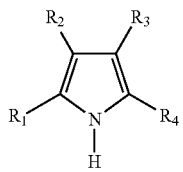

wherein:
(a) $R_1$ and $R_4$ are independently an alkyl containing one carbon atom to about 20 carbon atoms, $R_2$ and $R_3$ are independently hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(b) $R_1$ and $R_2$ form a fused aromatic ring of from 6 carbon atoms to 10 carbon atoms or aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(c) $R_2$ and $R_3$ form a fused aromatic ring of from 6 carbon atoms to 10 carbon atoms or aliphatic ring of from 4 carbon atoms to about 8 carbon atoms, and $R_1$ and $R_4$ are independently an alkyl containing one carbon atom to about 20 carbon atoms; or
(d) both $R_1$ and $R_2$, and $R_3$ and $R_4$, taken in pairs, independently form a aromatic ring of from 6 carbon atoms to 10 carbon atoms or aliphatic ring of from 4 carbon atoms to about 8 carbon atoms.

Preferably $R_1$ and $R_4$ are methyl and $R_2$ and $R_3$ are hydrogen.

In another preferred embodiment of the above method $R_1$, $R_2$, $R_3$ and $R_4$ are methyl.

In another preferred embodiment $R_1$ and $R_2$ are methyl and $R_3$ and $R_4$ form a fused benzo ring.

In a preferred embodiment the substituted-pyrrole has the following formula:

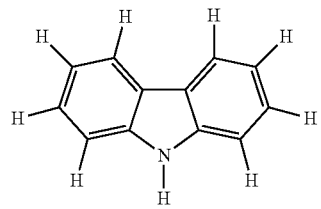 [SMILES: c1ccc2c(c1)[nH]c1ccccc12]

The nitrogen-containing five-membered aromatic ring employed in another embodiment of the present invention is a substituted imidazole.

The substituted imidazole in the method of the present invention has the general formula:

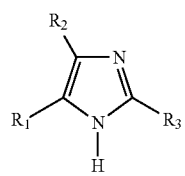

wherein $R_3$ is branched alkyl containing from about 4 carbon atoms to about 20 carbon atoms, and wherein
(a) $R_1$ and $R_2$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(b) $R_1$ and $R_2$ form a fused aromatic ring of from 6 carbon atoms to 10 carbon atoms or aliphatic ring of from 4 carbon atoms to about 8 carbon atoms.

In another preferred embodiment of the above method $R_1$ is methyl, $R_2$ is hydrogen and $R_3$ is tert-butyl.

Preferably the alkyl group on the nitrogen-containing five-membered aromatic ring in the method of the present invention has from about one carbon atom to about 20 carbon atoms. More preferably the alkyl group on the alkyl-substituted hetero-aromatic has from about one carbon atoms to about 12 carbon atoms. Most preferably the alkyl group on the alkyl-substituted hetero-aromatic has from about one carbon atoms to about 4 carbon atoms.

Preferably the Lewis acid in step (a) is a halide of titanium or boron. More preferably the Lewis acid is a titanium halide. Most preferably the Lewis acid is titanium tetrachloride. Preferred concentrations of the titanium tetrachloride exceed 2 times the combined concentrations of protic impurities, electron donor, common ion salt or its precursor, and the quenching agent or quenching agents.

The hindered secondary or tertiary amine in step (b) in the above method may be a linear secondary or tertiary amine, a cyclic secondary or tertiary amine or an aromatic secondary or tertiary amine.

In an embodiment of the above method the hindered secondary or tertiary amine in step (b) has the general formula:

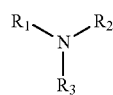

wherein $R_1$, $R_2$ and $R_3$ are independently hydrogen, alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$, $R_2$ and $R_3$ and $R_3$ and $R_1$, taken in pairs, independently form a fused aliphatic ring of from about 4 carbon atoms to about 8 carbon atoms;

provided that no more than one of $R_1$, $R_2$ and $R_3$ is hydrogen, and provided that $R_1$, $R_2$, and $R_3$ are not all linear alkyl of about 3 carbons or less.

In the above method the hindered amine is a tertiary or secondary amine has the general formula:

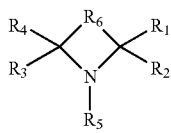

wherein $R_6$ is a divalent hydrocarbyl group of one carbon atom to about 4 carbon atoms each of which may be substituted with an alkyl group having one carbon atom to about 6 carbon atoms, and $R_1$, $R_2$, $R_3$, $R_4$, and $R_5$ are independently hydrogen, alkyl containing one carbon atom to about 20 carbon atoms, cycloalkyl of about 3 to about 8 carbon atoms, aryl of about 6 to about 30 carbon atoms, alkaryl of 7 to 30 carbon atoms, or aralkyl of 7 to 30 carbon atoms; provided if $R_1$, $R_2$, $R_3$, and $R_4$ are hydrogen, then $R_5$ is a branched alkyl from about 4 to about 20 carbon atoms, aryl of about 6 to about 30 carbon atoms, or aralkyl of about 7 to about 30 carbon atoms, and provided if $R_5$ is hydrogen, then $R_1$, $R_2$, $R_3$, and $R_4$ are not hydrogen, unless one of $R_1$ or $R_2$ and one of $R_3$ or $R_4$ is a branched alkyl having from about 4 to about 20 carbon atoms.

In a particularly preferred embodiment of the above method the hindered amine is a secondary or tertiary amine of the formula:

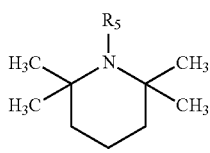

wherein $R_5$ is hydrogen or methyl.

In another preferred embodiment of the above method the hindered secondary or tertiary amine has the general formula:

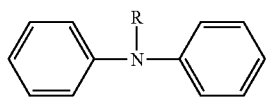

wherein R is hydrogen or alkyl containing one to about 20 carbon atoms or an aromatic or aliphatic ring of about 3 carbon atoms to about 7 carbon atoms.

In a particularly preferred embodiment of the above method the hindered secondary or tertiary amine has the formula:

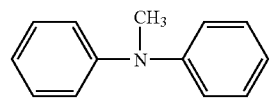

In a further preferred embodiment of the above method the hindered amine is a secondary amine of the formula:

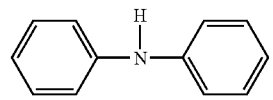

In another preferred embodiment of the above method the hindered amine is a tertiary amine of the formula:

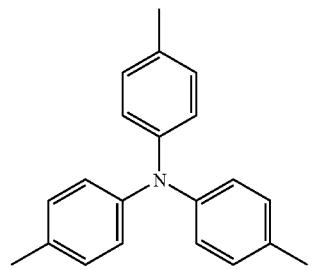

In yet another preferred embodiment of the above method the hindered amine is a tertiary amine of the formula:

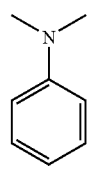

The hindered secondary or tertiary amine in another embodiment of the method of the present invention has the general formula:

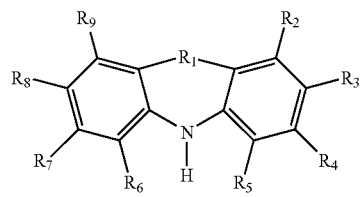

wherein $R_1$ is a divalent hydrocarbyl group of one carbon atom to about 4 carbons and $R_2$, $R_3$, $R_4$, $R_7$, $R_8$, and $R_9$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and one of $R_5$ and $R_6$ is hydrogen and the other is linear alkyl from one carbon atom to about 20 carbon atoms.

In a preferred embodiment of the above method one of $R_5$ and $R_6$ is hydrogen.

In an embodiment of the above method the amine has the general formula:

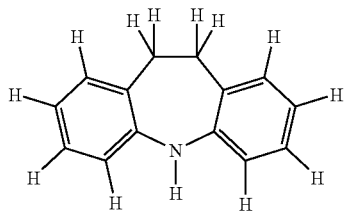

In yet another preferred embodiment of the above method the hindered amine is a tertiary amine of the formula:

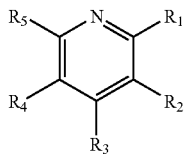

wherein one of $R_1$ and $R_5$ is hydrogen and the other is a branched alkyl of about 3 to about 20 carbon atoms, aryl of about 10 to about 30 carbon atoms, or aralkyl of about 11 to about 30 carbon atoms; $R_2$, $R_3$ and $R_4$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$, $R_2$ and $R_3$, $R_3$ and $R_4$, and $R_4$ and $R_5$, taken in pairs, independently form a fused aromatic ring of from 5 carbon atoms to 7 carbon atoms or aliphatic ring of from about 4 carbon atoms to about 8 carbon atoms, provided that if $R_1$ and $R_2$ form a fused aliphatic or aromatic ring, then $R_5$ is a branched alkyl of about 3 to about 20 carbon atoms, aryl of about 10 to about 30 carbon atoms, or aralkyl of about 11 to about 30 carbon atoms, and provided that if $R_4$ and $R_5$ form a fused aliphatic or aromatic ring, then $R_1$ is a branched alkyl of about 3 to about 20 carbon atoms, aryl of about 10 to about 30 carbon atoms, or aralkyl of about 11 to about 30 carbon atoms.

In a further embodiment of the above method $R_1$, $R_2$, $R_3$ and $R_4$ are hydrogen and $R_5$ is tert-butyl.

In another embodiment of the method of the present invention the hindered amine is nitrogen containing hetero-aromatic ring having the following formulas, (a), (b) and (c):

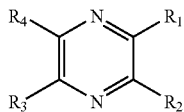

wherein in formula (a)
one of $R_1$ and $R_4$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, one of $R_2$ and $R_3$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$ and $R_3$ and $R_4$, taken in pairs, independently form a fused aromatic ring of from 5 carbon atoms to 7 carbon atoms or aliphatic ring of from about 4 carbon atoms to about 8 carbon atoms;

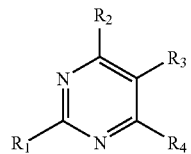

wherein in formula (b)
$R_1$, $R_2$ and $R_4$ are independently hydrogen or alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, $R_3$ is hydrogen, alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_2$ and $R_3$ or $R_3$ and $R_4$, taken in pairs, independently form a fused aromatic ring of from 5 carbon atoms to 7 carbon atoms or aliphatic ring of from about 4 carbon atoms to about 8 carbon atoms, provided that if $R_1$ is hydrogen then $R_2$ and $R_4$ are independently alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and further provided that if $R_2$ or $R_4$ is hydrogen, then $R_1$ is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms;

and

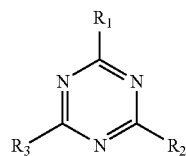

wherein in formula (c)
$R_1$, $R_2$ and $R_3$ are independently hydrogen or alkyl of one carbon to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms.

In a preferred embodiment of the above method the hindered amine has the formula:

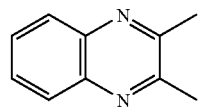

In a further embodiment of the above method the hindered amine has the formula:

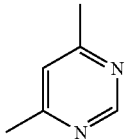

In yet another preferred embodiment of the above method the hindered amine has the formula:

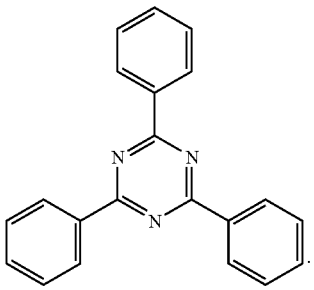 [SMILES: c1ccc(-c2nc(-c3ccccc3)nc(-c3ccccc3)n2)cc1]

In the above method the exo-olefinic end group on the polymer chain of the polyolefin product in step (b) is present in the range of about one percent to about 100 percent of the total olefin yield. Preferably the exo-olefinic end group on the polymer chain in step (c) is at least 3 percent of the total olefin yield. More preferably the exo-olefinic end group on the polymer chain in step (c) is at least 20 percent, still more preferably at least 50 and most preferably at least 70 percent of the total olefin yield.

A further embodiment of the present invention is directed to a method for preparing a polyolefin product containing exo-olefinic end groups on the polyolefin polymer chain, which method comprises:
  (a) ionizing a polyolefin containing terminal tert-chloride chain ends on the polymer chain in the presence of a Lewis acid; and
  (b) reacting the ionized polyolefin with one or more nitrogen-containing five-membered aromatic ring compounds selected from pyrroles and imidazoles having at least two hydrocarbyl substituents on the ring, or one or more hindered secondary or tertiary amines containing only carbon, hydrogen, and nitrogen atoms, or mixtures thereof, wherein the nitrogen-containing aromatic amine compounds or the hindered secondary or tertiary amines are pre-reacted with a Lewis acid, provided the nitrogen containing five-membered aromatic ring is not:
    (i) 2,4-dimethylpyrrole;
    (ii) 2-phenylindole;
    (iii) 2-methylbenzimidazole;
    (iv) 1,2-dimethylimidazole;
    (v) 2-phenylimidazole; and
    (vi) 2,4,5-triphenylimidazole;
  and provided the hindered secondary or tertiary amines are not:
    (i) Triethylamine;
    (ii) Tri-n-butylamine;
    (iii) Trihexylamine;
    (iv) Triisooctylamine;
    (v) 2-phenylpyridine;
    (vi) 2,3-cyclododecenopyridine;
    (vii) Di-p-tolylamine;
    (viii) Quinaldine; and
    (ix) 1-pyrrolidino-1-cyclopentene;
to thereby obtain the polyolefin product containing exo-olefinic end groups on the polyolefin polymer chain.

The nitrogen containing five-membered aromatic ring compound in a preferred embodiment of the above method is 2,5-dimethylpyrrole and the Lewis acid is Titanium tetrachloride.

In a preferred embodiment of the above method the Lewis acid is titanium tetrachloride and the hindered amine is 1,2,2,6,6-pentamethylpiperidine.

DETAILED DESCRIPTION OF THE INVENTION

Definitions

As used herein, the following terms have the following meanings unless expressly stated to the contrary:

The term "alkyl" as used herein refers to straight chain and branched chain saturated aliphatic groups typically having from one to about 20 carbon atoms. Some examples of straight chain and branched chain saturated aliphatic groups are methyl, ethyl, propyl, butyl, isopropyl, isobutyl, sec-butyl, tert-butyl, and the like.

The term "aromatic or aliphatic fused ring" as used herein refers to the ring formed by two adjacent carbon atoms on the pyrrole or imidazole ring, and the ring thus formed is fused to the pyrrole or imidazole ring. An example of a fused aromatic ring is a benzo group fused to the pyrrole ring or imidazole ring. A fused aliphatic ring may be any cyclic ring structure fused to the pyrrole ring or imidazole ring.

The term "branched alkyl" as used herein refers to an alkyl group in which the carbon atom representing the point of attachment of the group to the rest of the molecule is either a tertiary or quaternary carbon atom. The term "tertiary carbon" as used herein refers to a carbon atom that is attached to three other carbon atoms. The term "quaternary carbon" as used herein refers to a carbon atom that is attached to 4 other carbon atoms.

The terms "carbenium ion" or "carbocation" as used herein refer to a positively charged carbon atom bearing three $sp^2$-bonded substituents and an empty p orbital.

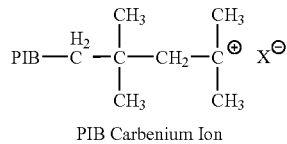

PIB Carbenium Ion

The term "chain transfer" as used herein refers to the cessation of growth of one polymerization chain with the possible initiation of another polymerization chain.

The term "common ion salt" as used herein refers to an ionic salt that is optionally added to a quasi-living cationic polymerization mixture to prevent dissociation of the propagating carbenium ion and counter-ion pairs. The anion of the common ion salt is identical to the counter-ions of the propagating chain ends. The cation of the common ion salt is typically a fatty quaternary ammonium cation, such as tetra-n-butyl ammonium ion, which confers solubility in the organic media.

The term "coupled product" as used herein refers to the product of addition of a PIB terminal carbenium ion to a PIB exo-olefin chain end. Coupled product has a number average molecular weight that is approximately twice that of the main polymer product.

The term "coupling" as used herein refers to the addition of a polyisobutylene terminal carbenium ion to a polyisobutylene exo-olefin chain end.

The term "conventional polymerization" as used herein refers to polymerization wherein the chain-reaction polymerization involving olefins proceeds with ions as chain carrying particles, either anions or cations. Polymerization proceeds through the steps of chain initiation, chain propogation, chain transfer and chain termination.

The term "di-EAS product" as used herein refers to the product which results when two separate polyisobutylene terminal carbenium ions react to form a covalent bond with a single quenching agent molecule. Di-EAS product contains in its structure a residue from the quenching agent.

The terms "di-substituted olefin" or "exo-olefin" or "methyl vinylidene" as used herein refer to an olefin polymer chain containing an exo-olefin chain end as shown below.

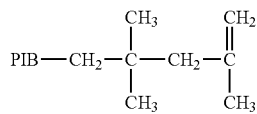

The term "di-valent hydrocarbyl" as used herein refers to a hydrocarbyl group which possesses two points of attachment to the rest of the molecule.

The term "EAS product" as used herein refers to the product which results when one polyisobutylene terminal carbenium ion reacts to form a covalent bond with a single quenching agent molecule. EAS product contains in its structure a residue from the quenching agent.

The term "electron donor" as used herein refers to a basic and/or nucleophilic substance added to the polymerization reaction that is either fully complexed with the Lewis acid or fully non-complexed with the Lewis acid. The concentration of electron donor exceeds the concentration of the protic impurities, for example water.

The term "electrophilic aromatic substitution or EAS" as used herein refers to the process by which the EAS product is produced.

The term "gem-dimethyl carbons" as used herein refers to the two methyl carbons alpha to the carbenium ion or the chloride bonded carbon of the polyolefin polymer chain end as depicted in the structure below.

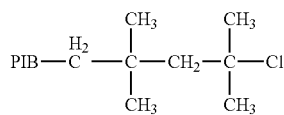

PIB tert-Chloride

The term "hydrocarbyl" refers to an organic radical primarily composed of carbon and hydrogen which may be aliphatic, alicyclic, aromatic or combinations thereof, e.g., aralkyl or alkaryl. Such hydrocarbyl groups may also contain aliphatic unsaturation, i.e., olefinic or acetylenic unsaturation, and may contain minor amounts of heteroatoms, such as oxygen or nitrogen, or halogens, such as chlorine.

The term "hindered secondary or tertiary amine" as used herein refers to a compound that is appropriately substituted such that it is sufficiently sterically hindered to be not fully complexed with the Lewis acid, yet sufficiently sterically hindered to allow its reaction with the carbenium ion. Preferably the hindered amine is a tertiary amine.

The term "Lewis acid" as used herein refers to a compound that can accept a pair of electrons to form a covalent bond.

The term "living polymerization" as used herein refers to the polymerizations that proceed in the absence of measurable chain transfer and chain termination.

The term "nitrogen-containing five-membered aromatic ring" as used herein refers to pyrroles and imidazoles containing at least one nitrogen atom in the aromatic ring and a maximum of 2 nitrogen atoms in the aromatic ring, and having from about 2 alkyl groups to about 4 alkyl groups containing from about one carbon atom to about 20 carbon atoms attached to the ring. Some examples of nitrogen-containing five-membered aromatic ring compounds contemplated for use in the present invention are substituted-pyrroles.

The term "quasi-living polymerization" as used herein refers to living polymerizations wherein reversible chain terminations is operable, but irreversible chain termination and chain transfer approaches zero.

The term "polyolefin" as used herein refers to a polymer of one or more olefins, such as ethylene, propylene, styrene, isobutylene, etc.

The term "regiospecific" as used herein refers to chemical reactions that give exclusively or nearly exclusively one of several possible isomeric products.

The term "reacting agent" as used herein refers to a chemical compound which is added to the ionized polyolefin to react with the ionized polyolefin chain end.

The term "termination" as used herein refers to the chemical reaction that terminates polymerization process or the quenching reaction by destruction of the Lewis acid.

The term "terminator" as used herein refers to the chemical compound that terminates polymerization process or the quenching reaction, but may not simultaneously initiate a new polymer chain. A number of alcohols may be used as terminators.

The term "tert-chloride" refers to the 2-chloro-2-methyl-propyl end group on a polyolefin polymer chain.

Unless otherwise specified, all percentages are in weight percent.

It has been determined that the nitrogen-containing five-membered aromatic ring compounds, such as substituted-pyrroles and substituted-imidazoles, and hindered secondary and tertiary amines used as reacting agents in the preparation of polyolefin polymers of the present invention are capable of quantitatively converting polyolefin polymer endo-olefin chain ends and tert-chloride chain ends to the exo-olefin chain ends. Without being bound by any theory it is believed that these reacting agents selectively catalyze the elimination of a proton exclusively from the gem-dimethyl carbon of the ionized polyisobutylene chain end as shown below.

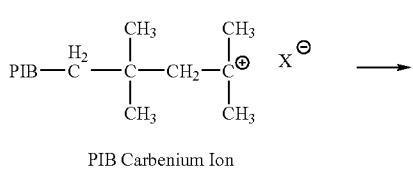

PIB Carbenium Ion

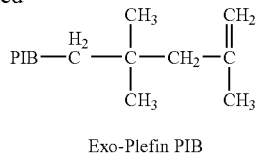

Exo-Plefin PIB

This result was unexpected since the reacting agents used in the preparation of the polyolefin polymers of the present invention are known to quench living polymerizations by an addition mechanism. Compounds which provide the highest addition yields are typically substituted with electron donating groups located at strategic positions on the ring. It is believed that these substituents provide stabilization for the Friedel-Craft intermediates formed when, for example polyisobutylene, carbenium ions react with olefins in the ring.

The reacting agents used in the present invention are able to quantitatively convert polyolefin polymers containing tert-chloride chain ends to the exo-olefin chain ends. A 100 percent conversion was observed within 15 minutes after addition of the reacting agent.

General Procedure for Preparation of Polyolefin Polymers Containing Exo-Olefin End Groups on the Chain A typical procedure for the preparation of polyolefin polymers of the present invention is given below:

The method of the present invention may be conducted as a batch process, a continuous process, a semi-batch process or by any process known by persons skilled in the art.

The polymerization reaction is carried out under inert gas and in a substantially anhydrous environment. The reactor is charged with the following reactants:

1. A polyolefin containing tert-chloride chain ends,
2. a diluent,
3. an electron donor or common ion salt,
4. monomers, and
5. a Lewis acid, which typically comprises a halide of titanium or boron;

The reaction mixture is equilibrated at the desired temperature, ranging from above −130° C. to about 10° C. The method of the present invention may be carried out at any desired pressure, atmospheric, sub-atmospheric or super-atmospheric pressure.

6. One or more nitrogen-containing five-membered ring compounds or hindered secondary or tertiary amine reacting agents is added to the reaction mixture to react with the ionized polyolefin chain end.

Additional aliquots are removed from the reaction mixture at various time intervals after addition of the reacting agent to determine the concentration of the exo-olefin chain ends on the polyolefin polymers. The reaction is terminated in all the aliquot samples and the remaining reaction mixture with an appropriate alcohol equilibrated at the desired temperature.

Although, the concentration of the reactants may be varied to obtain the desired product, it has been found that certain ratios of the reactants are important for obtaining high exo-olefin chain end yield. The ratios are described below:

The molar ratio of Lewis acid to chain ends is in the range from about 0.1:1 to about 2500:1. Preferably the molar ratio of Lewis acid to chain ends is in the range of about 2:1 to about 200:1. More preferably the molar ratio of Lewis acid to chain ends is about 2:1 to 15:1.

The molar ratio of Lewis acid to electron donor is in the range from about 1.1:1 to about 10,000:1. Preferably the molar ratio of Lewis acid to electron donor is in the range of about 2:1 to about 100:1. More preferably the molar ratio of Lewis acid to electron donor is about 4:1 to 30:1.

The molar ratio of Lewis acid to reacting agent is in the range from about 1.1:1 to about 2500:1. Preferably the molar ratio of Lewis acid to reacting agent is in the range of about 2:1 to about 100:1. More preferably the molar ratio of Lewis acid to reacting agent is about 2:1 to 15:1.

The molar ratio of reacting agent to chain ends is in the range from about 0.25:1 to about 20:1. Preferably the molar ratio of reacting agent to chain end is in the range of about 0.5:1 to about 5:1. More preferably the molar ratio of reacting agent to chain end is about 0.5:1 to 4:1.

The concentration of the exo-olefin chain ends, along with the concentration of the endo-olefin and tert-chloride chain ends, is quantified using $^1$H NMR. GPC spectra are also obtained to qualitatively determine the amount of the EAS product, the di-EAS product and the coupled product.

Compounds suitable for use in the preparation of the polyolefin polymers of the present invention are given below:

Diluents

Diluents influence the ionization equilibria and rates of exchange of growing species through their polarity, which can be estimated from their dielectric constants. Typically, solvents having low dielectric constants are preferred since ion pairs are less dissociated. Suitable solvents include, but are not limited to, low-boiling alkanes and alkyl mono or polyhalides with reasonably low freezing points to be used at the preferred polymerization temperature. Illustrative solvents include alkanes (generally $C_2$ to $C_{10}$ alkanes, including normal alkanes such as propane, normal butane, normal pentane, normal hexane, normal heptane, normal octane, normal nonane and normal decane, and branched alkanes including isobutane, isopentane, isohexane, 3-methylpentane, 2,2-dimethylbutane, 2,3-dimethylbutane and the like), alkenes and alkenyl halides (such as vinyl chloride), carbon disulfide, chloroform, ethylchloride, N-butyl chloride, methylene chloride, methyl chloride, 1,2-dichloroethane, 1,1,2,2-tetrachloroethane, sulfur dioxide, acetic anhydride, carbon tetrachloride, acetonitrile, neopentane, benzene, toluene, methylcyclohexane, chlorobenzene, 1,1-dichloroethane, 1,1-dichloroethene, 1,2-dichloroethene, n-propyl chloride, isopropyl chloride, 1,2-dichloropropane, or 1,3-dichloropropane, nitro-alkanes (such as nitropropane) to name a few of the representative liquid diluents or solvents useful in cationic polymerizations. Mixed solvents (for example combinations of those listed above) can also be used.

Electron Donors

Electron donors have been shown to convert traditional polymerization systems into living and/or quasi-living cationic polymerizations systems. The proton trap used in the present invention is not specifically limited to any particular compound or class of compounds. Examples include pyridines and n-alkyl amines, aprotic amides, sulfoxides, esters, metal compounds having an oxygen atom bonded to a metal atom, and others. Pyridine compounds include 2,6-di-tert-butylpyridine, 2,6-dimethylpyridine, 2,4-dimethylpyridine, 2,4,6-trimethylpyridine, 2-methylpyridine, pyridine; N,N-dimethylaniline, aniline. Amide compounds include N,N-dimethylformamide, N,N-dimethylacetamide, N,N-diethylacetamide. An example of a sulfoxide compound is dimethyl sulfoxide. Diethyl ether is an example of an ether compound, and methyl acetate and ethyl acetate are examples of ester compounds. Phosphate compounds such as trimethyl phosphate, tributyl phosphate, triamide hexamethylphosphate may also be employed. Oxygen-containing metal compounds such as tetraisopropyl titanate are also useful as electron donors.

The concentration of the electron donors in the total reaction mixture may be in the range from about 0.001 moles per liter to about 0.1 moles per liter. Preferably the concentration of the electron donors is in the range from about 0.001 moles per liter to about 0.05 moles per liter. More preferably the concentration of the electron donors is in the range from about 0.002 moles per liter to about 0.02 moles per liter.

Common Ion Salts and Common Ion Salt Precursors

Common ion salts or salt precursors may be optionally added to the reaction mixture in addition to or replacement of the electron donor. Typically, these salts are used to increase the ionic strength, suppress free ions, and beneficially interact with ligand exchange. Particularly preferred are common ion salt precursors, for example tetra-n-butylammonium chloride (n-Bu$_4$NCl).

The concentration of the common ion salts or salt precursors in the total reaction mixture may be in the range from about 0.0005 moles per liter to about 0.05 moles per liter. Preferably the concentration of the common ion salts or salt precursors is in the range from about 0.0005 moles per liter to about 0.025 moles per liter. More preferably the concentration of the common ion salt or salt precursors is in the range from about 0.001 moles per liter to about 0.007 moles per liter.

Lewis Acids

Lewis acids that are suitable as catalysts for purposes of the invention include, but are not limited to, titanium and boron halides, particularly titanium tetrachloride and boron trichloride, aluminum trichloride, tin tetrachloride, zinc chloride, ethyl aluminum dichloride and others. Use of the titanium halides and particularly titanium tetrachloride is preferred. The strength of the Lewis acid and its concentration should be adjusted for the particular monomer. Additionally, the strength of these Lewis acids can be adjusted using nucleophilic additives. In some instances these Lewis acids are also referred to as co-initiators.

The amount of the Lewis acid present in the initiator system may vary. However, it is desirable that the concentration of Lewis acid is sufficient to achieve an appropriate rate of polymerization and quenching. The Lewis acid concentration should not be so high as to precipitate the formed polymer.

The concentration of the Lewis acid in the total reaction mixture may be in the range from about 0.001 moles per liter to about 3.0 moles per liter. Preferably the concentration of the Lewis acid is in the range from about 0.005 moles per liter to about 1.5 moles per liter. More preferably the concentration of the Lewis acid is in the range from about 0.05 moles per liter to about 1.0 moles per liter.

Reacting Agents

Reacting agents contemplated for use in preparation of the polyolefin in the present invention are nitrogen-containing five membered aromatic ring compounds such as substituted-pyrroles and substituted imidazoles.

The substituted pyrrole employed in the present invention has the general formula:

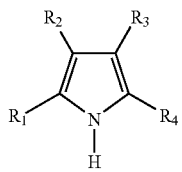

wherein $R_1$, $R_2$, $R_3$ and $R_4$ are as described below:
(a) wherein $R_1$ and $R_4$ are independently an alkyl containing one carbon atom to about 20 carbon atoms, $R_2$ and $R_3$ are independently hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(b) $R_1$ and $R_2$ form a fused aromatic ring of from 6 carbon atoms to 10 carbon atoms or aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(c) $R_2$ and $R_3$ form a fused aromatic ring of from 6 carbon atoms to 10 carbon atoms or aliphatic ring of from 4 carbon atoms to about 8 carbon atoms, and $R_1$ and $R_4$ are independently an alkyl containing one carbon atom to about 20 carbon atoms; or
(d) both $R_1$ and $R_2$, and $R_3$ and $R_4$, taken in pairs, independently form a aromatic ring of from 6 carbon atoms to 10 carbon atoms or aliphatic ring of from 4 carbon atoms to about 8 carbon atoms.

The substituted-imidazole employed in the present invention has the general formula:

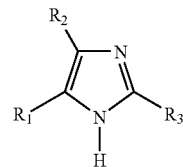

wherein $R_3$ is branched alkyl containing from about 4 carbon atoms to about 20 carbon atoms, and wherein
(a) $R_1$ and $R_2$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(b) $R_1$ and $R_2$ form a fused aromatic ring of from 6 carbon atoms to 10 carbon atoms or aliphatic ring of from 4 carbon atoms to about 8 carbon atoms.

Structures of other nitrogen-containing five-membered aromatic ring compounds that may be employed in the method of the present invention are given below. The given structures are only intended as examples and in no way limit the scope of the present invention.

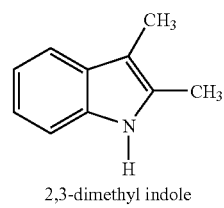
2,3-dimethyl indole

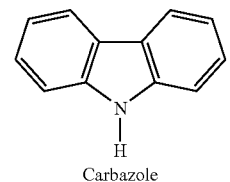
Carbazole

Reacting agents contemplated for use in preparation of the polyolefin in the present invention may be hindered secondary or tertiary amine compounds, such as 2-tertbutyl pyridine, n-tributylamine, 1,2,2,6,6-pentamethyl piperidine and N-methyldiphenylamine.

The hindered secondary or tertiary amine employed as a reacting agent in the present invention has the general formula:

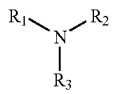

wherein $R_1$, $R_2$ and $R_3$ are independently hydrogen, alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$, $R_2$ and $R_3$ and $R_3$ and $R_1$, taken in pairs, independently form a fused aliphatic ring of from about 4 carbon atoms to about 8 carbon atoms;

provided that no more than one of $R_1$, $R_2$ and $R_3$ is hydrogen, and provided that $R_1$, $R_2$, and $R_3$ are not all linear alkyl of about 3 carbons or less.

In a preferred embodiment of the above method the hindered secondary or tertiary amine has the general formula:

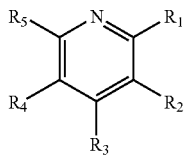

wherein one of $R_1$ and $R_5$ is hydrogen and the other is a branched alkyl of about 3 to about 20 carbon atoms, aryl of about 10 to about 30 carbon atoms, or aralkyl of about 11 to about 30 carbon atoms; $R_2$, $R_3$ and $R_4$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$, $R_2$ and $R_3$, $R_3$ and $R_4$, and $R_4$ and $R_5$, taken in pairs, independently form a fused aromatic ring of from 5 carbon atoms to 7 carbon atoms or aliphatic ring of from about 4 carbon atoms to about 8 carbon atoms, provided that if $R_1$ and $R_2$ form a fused aliphatic or aromatic ring, then $R_5$ is a branched alkyl of about 3 to about 20 carbon atoms, aryl of about 10 to about 30 carbon atoms, or aralkyl of about 11 to about 30 carbon atoms, and provided that if $R_4$ and $R_5$ form a fused aliphatic or aromatic ring, then $R_1$ is a branched alkyl of about 3 to about 20 carbon atoms, aryl of about 10 to about 30 carbon atoms, or aralkyl of about 11 to about 30 carbon atoms.

The hindered amine employed in the method of the present invention may be a nitrogen containing hetero-aromatic ring having the following formulas, (a), (b) and (c):

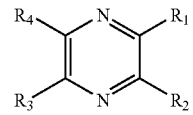

wherein in formula (a)
one of $R_1$ and $R_4$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, one of $R_2$ and $R_3$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$ and $R_3$ and $R_4$, taken in pairs, independently form a fused aromatic ring of from 5 carbon atoms to 7 carbon atoms or aliphatic ring of from about 4 carbon atoms to about 8 carbon atoms;

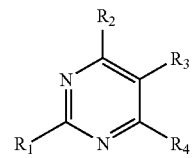

wherein in formula (b)
$R_1$, $R_2$ and $R_4$ are independently hydrogen or alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, $R_3$ is hydrogen, alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_2$ and $R_3$ or $R_3$ and $R_4$, taken in pairs, independently form a fused aromatic ring of from 5 carbon atoms to 7 carbon atoms or aliphatic ring of from about 4 carbon atoms to about 8 carbon atoms,
provided that if $R_1$ is hydrogen then $R_2$ and $R_4$ are independently alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and further provided that if $R_2$ or $R_4$ is hydrogen, then $R_1$ is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms;

and

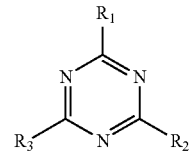

wherein in formula (c)

$R_1$, $R_2$ and $R_3$ are independently hydrogen or alkyl of one carbon to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms.

Structures of other hindered secondary or tertiary amines that may be employed in the method of the present invention are given below. The given structures are only intended as examples and in no way limit the scope of the present invention.

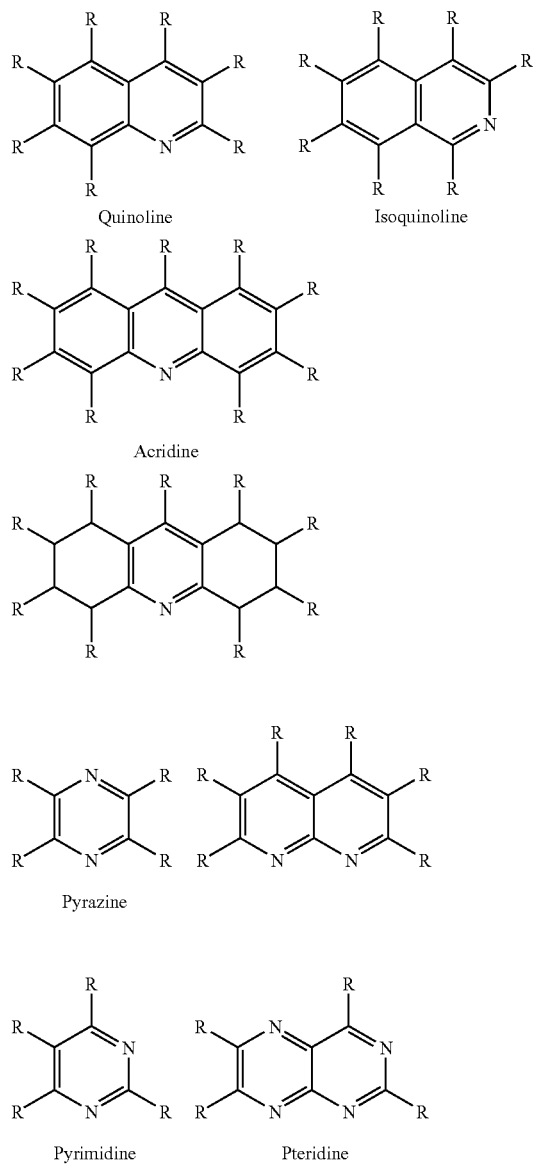

The concentration of the reacting agent in the total reaction mixture may be in the range from about 0.0001 moles per liter to about 2.0 moles per liter. Preferably the concentration of the reacting agent is in the range from about 0.001 moles per liter to about 1.0 moles per liter. More preferably the concentration of the reacting agent is in the range from about 0.005 moles per liter to about 0.5 moles per liter.

Terminators

Any soluble alcohol may be used to terminate the polymerization reaction in the present invention. Preferred are monoalcohols containing from about one carbon atom to about 8 carbon atoms.

EXAMPLES

Example 1

Preparation of Polyisobutylene Containing Exo-Olefin Chain Ends Using 2,5-Dimethylpyrrole A four-neck 250 milliliter round-bottom flask was equipped with an overhead mechanical stirrer and platinum resistance thermometer. This assembly was immersed into a heptane bath at −62° C. under dry nitrogen gas in a substantially inert atmosphere MBraun glovebox. The flask was then charged with the following reactants:

75 milliliters methyl chloride equilibrated at −60° C.

113 milliliters hexane equilibrated at −60° C.

6.03 grams polyisobutylene containing 100 percent tert-chloride chain ends with a molecular weight of approximately 2,000 grams per mole equilibrated at −60° C.

0.23 milliliters 2,6-dimethylpyridine equilibrated at room temperature.

The contents of the round-bottom flask were equilibrated.

With continued stirring, next 1.82 milliliters titanium tetrachloride was charged to the flask. Fifteen seconds later, to the reaction mixture in the round-bottomed flask was charged the reacting agent, 0.40 milliliters 2,5-dimethylpyrrole (neat and at room temperature). After the addition of the 2,5-dimethylpyrrole, aliquots, approximately 5-10 milliliter, were removed from the flask using a glass pipette and charged into a scintillation vial containing 4 milliliters anhydrous methanol equilibrated at −60° C. to terminate the reaction.

Next to the remaining reaction mixture in the round-bottom flask was charged an appropriate amount of anhydrous methanol equilibrated at −60° C. to terminate the reaction at 223 minutes after the addition of the 2,5-dimethylpyrrole.

The aliquots samples and the final terminated reaction mixture were allowed to warm to room temperature. Next the volatile components were evaporated. To each aliquot sample 1-2 milliliter hexane was added and the polymer was precipitated in methanol. Polyisobutylene was recovered in each aliquot sample and agitated in a vortex with fresh methanol to remove any remaining contaminants and the methanol was decanted. Polyisobutylene samples recovered in each aliquot were placed in a vacuum oven at room temperature for at least 24 hours to remove any remaining solvents.

Tables I and II below summarize the reaction conditions and the molar quantities of the reactants used in Example I.

The following abbreviations are used for the reactants in Tables I and II below:

TMPCI is an abbreviation of 2-chloro-2,4,4-trimethylpentane.

25DMPy is an abbreviation of 2,5-dimethylpyrrole.

The diluent used in Example 1 was a mixture of hexane and methyl chloride in a volume ratio of 60:40.

TABLE I

| Example | Polyisobutylene (grams) | 2,6-Dimethyl pyridine (grams) | TiCl$_4$ (grams) | Reacting Agent | Reacting Agent (grams) | Total Reaction Volume (liters) | Total Diluent (liters) | Temperature (° C.) |
|---|---|---|---|---|---|---|---|---|
| 1 | 6.03 | 0.2143 | 3.1489 | 25DMPy | 0.373 | 0.200 | 0.189 | −60 |

TABLE II

| Example | Polyisobutylene (moles per liter) | 2,6-Dimethyl pyridine (moles per liter) | TiCl$_4$ (moles per liter) | Reacting Agent | Quenching Agent (moles per liter) | Total Reaction Volume (liters) | Total Diluent (liters) | Temperature (° C.) |
|---|---|---|---|---|---|---|---|---|
| 1 | 0.537 | 0.010 | 0.083 | 25DMPy | 0.0196 | 0.200 | 0.189 | −60 |

Polyisobutylene samples were analyzed using $^1$H NMR and GPC as described below.

Procedure for Collecting $^1$H NMR Data $^1$H NMR spectra were collected using a Bruker AC-300 (300 MHz) spectrophotometer using samples concentrations of 3 percent to 5 percent (weight/weight) in CDCl$_3$. $^1$H NMR spectra were used for analysis of the end groups. Fractions of exo-olefin, endo-olefin, tert-chloride and coupled olefin chain ends were obtained using $^1$H NMR integration as described in the following section.

Procedure for Collecting GPC Data

GPC data were used to determine number average molecular weight ($M_n$), weight average molecular weight ($M_w$) and Polydispersity index (PDI), i.e. $M_w/M_n$. GPC was also used to qualitatively detect olefin coupled product.

Procedure for Calculating the Fractional Amounts of Chain Ends on the Polyisobutylene Product The fractions of exo-olefin, endo-olefin, and tert-chloride chain ends, and EAS, di-EAS, and coupled products in the polyisobutylene samples were quantified using $^1$H NMR integration. It was assumed that these six species represent 100 percent of the chain ends. In some instances, EAS, di-EAS, and coupled products were deemed to be absent by qualitative inspection of the $^1$H NMR spectrum, and for di-EAS and coupled products, by confirming the absence of a shoulder on the low elution volume side of the main polymer peak in the GPC chromatogram. Two procedures are given below. The "General Procedure" was used when coupled product was detected; the "Special Procedure" was used when coupled product was deemed to be absent.

General Procedure

The fractional molar amount of each type of chain end was obtained using an equation analogous to the equation given below for determining the fractional amount of exo-olefin, $$F(\text{exo}) = (A_{exo})/(A_{exo} + A_{endo} + A_{tert\text{-}Cl} + A_{EAS} + 2A_{di\text{-}EAS} + 2A_{coupled}) \quad (1)$$

where $A_{endo}$ is the area of the single olefinic resonance at 5.15 ppm, $A_{exo}$ is the area of the exo-olefinic resonance 4.63 ppm, and $A_{tert\text{-}Cl}$ was calculated as follows:

$$A_{tert\text{-}Cl} = (A_{1.65\text{-}1.72}/6) - A_{endo} \quad (2)$$

where $A_{1.65\text{-}1.72}$ is the integrated area of the convoluted peaks associated with the gem-dimethyl protons of the endo-olefin and the tert-chloride chain ends. The integrated area of EAS or di-EAS product, when present, was evaluated on a situation-by-situation basis; the integration was determined based on a peak that is not convoluted by other peaks, and the area was normalized based on the number of protons that have that characteristic peak. It will be noted that a co-efficient of 2 appears in equation (1) for both di-EAS and coupled product, to account for the fact that creation of either of these products consumes 2 polyisobutylene chains. $A_{coupled}$ was calculated as follows:

$$A_{coupled} = (A_{5.0\text{-}4.75} - A_{4.5\text{-}4.75})/2 \quad (3)$$

where $A_{5.0\text{-}4.75}$ is the integrated area of the convoluted peaks associated with one of the exo-olefin protons and the two identical protons of the coupled product, and where $A_{4.5\text{-}4.75}$ is the integrated area of the peak associated with the other exo-olefin proton.

Special Procedure

In the qualitative absence of coupled product, the fractional molar amount of each type of chain end was obtained using an equation analogous to the equation given below for determining the fractional amount of exo-olefin, $$F(\text{exo}) = (A_{exo})/(A_{exo} + A_{endo} + A_{tert\text{-}Cl} + A_{EAS} + 2A_{di\text{-}EAS}) \quad (1)$$

where $A_{endo}$ is the area of the single olefinic resonance at 5.15 parts per million, $A_{exo}$ is the average area of the two exo-olefinic resonances at 4.63 and 4.85 parts per million, and $A_{tert\text{-}Cl}$, $A_{EAS}$, and $A_{di\text{-}EAS}$ were calculated in the same manner as described in the "General Procedure."

Table III below summarizes the $^1$H NMR data obtained on the polyisobutylene product of Example I. The chain ends are given as mole percent of the total chain ends.

TABLE III

| Example | Exo-Olefin Chain End (mole %) | Endo-Olefin Chain End (mole %) | Tert-Cl Chain End (mole %) | EAS Chain End (mole %) | di-EAS Chain End (mole %) | Coupled Product (mole %) | Reaction Temperature (° C.) |
|---|---|---|---|---|---|---|---|
| 1 | 100 | 0 | 0 | 0 | 0 | 0 | −60 |

What is claimed is:

1. A method for preparing a polyolefin product containing exo-olefinic end groups on the polymer chain, comprising:
   (a) ionizing a polyolefin containing terminal tert-chloride chain ends on the polymer chain in the presence of a Lewis acid to form an ionized polyolefin; and
   (b) reacting the ionized polyolefin with:
       (i) one or more pyrroles of formula I:

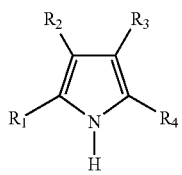

I wherein:
   (1) $R_1$ and $R_2$ form a fused aromatic ring of from 6 carbon atoms to 10 carbon atoms or an aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
   (2) $R_2$ and $R_3$ form a fused aromatic ring of from 6 carbon atoms to 10 carbon atoms or an aliphatic ring of from 4 carbon atoms to about 8 carbon atoms, and $R_1$ and $R_4$ are independently an alkyl containing one carbon atom to about 20 carbon atoms; or
   (3) both $R_1$ and $R_2$, and $R_3$ and $R_4$, taken in pairs, independently form a fused aromatic ring of from 6 carbon atoms to 10 carbon atoms or an aliphatic ring of from 4 carbon atoms to about 8 carbon atoms;
(ii) one or more imidazoles having at least two hydrocarbyl substituents, provided that the one or more imidazoles are not
   (1) 2-methylbenzimidazole;
   (2) 1,2-dimethylimidazole;
   (3) 2-phenylimidazole; and
   (4) 2,4,5-triphenylimidazole; or
(iii) one or more hindered secondary or tertiary amines of:
   formula II:

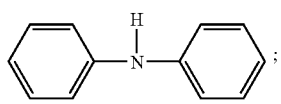

II formula III:

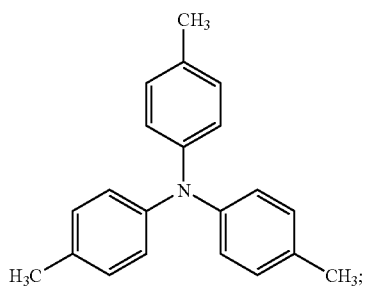

III formula IV:

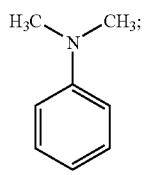

IV formula V:

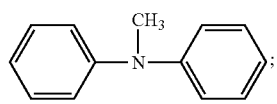

V formula VI:

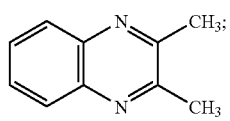

VI formula VII:

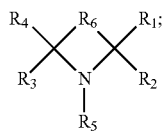

VII wherein $R_6$ is a divalent hydrocarbyl group of one carbon atom to about 4 carbon atoms, which may be substituted with an alkyl group having one carbon atom to about 6 carbon atoms, and $R_1$, $R_2$, $R_3$, $R_4$, and $R_5$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons; provided that if $R_1$, $R_2$, $R_3$, and $R_4$ are hydrogen, then $R_5$ is a branched alkyl having from about 4 to about 20 carbon atoms, aryl of about 6 to about 30 carbon atoms, or aralkyl of about 7 to about 30 carbon atoms, and provided that if $R_5$ is hydrogen, then $R_1$, $R_2$, $R_3$, and $R_4$ cannot be hydrogen unless either $R_1$ or $R_2$ and either $R_3$ or $R_4$ is a branched alkyl from about 4 to about 20 carbon atoms;

formula VIII:

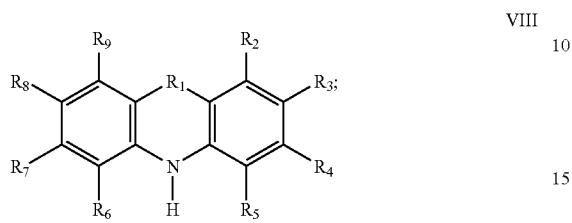

wherein $R_1$ is a divalent hydrocarbyl group of one carbon atom to about 4 carbons, and $R_2$, $R_3$, $R_4$, $R_7$, $R_8$, and $R_9$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons, and one of $R_5$ and $R_6$ is hydrogen and the other is linear alkyl from one carbon atom to about 20 carbon atoms;

formula IX:

wherein one of $R_1$ and $R_4$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, one of $R_2$ and $R_3$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$ and $R_3$ and $R_4$, taken in pairs, independently form a fused aromatic ring of from 5 carbon atoms to 7 carbon atoms or aliphatic ring of from about 4 carbon atoms to about 8 carbon atoms;

formula X:

wherein $R_3$, $R_2$ and $R_4$ are independently hydrogen or alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, $R_3$ is hydrogen, alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_2$ and $R_3$ or $R_3$ and $R_4$, taken in pairs, independently form a fused aromatic ring of from 5 carbon atoms to 7 carbon atoms or aliphatic ring of from about 4 carbon atoms to about 8 carbon atoms, provided that if $R_1$ is hydrogen, then $R_2$ and $R_4$ are independently alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and further provided that if $R_2$ or $R_4$ is hydrogen, then $R_1$ is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms;

or formula XI:

wherein $R_1$, $R_2$ and $R_3$ are independently hydrogen or alkyl of one carbon to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms.

2. The method of claim 1, wherein the ionized polyolefin of step (b) is reacted with one or more pyrroles of formula I:

wherein:
(1) R1 and $R_2$ form a fused aromatic ring of from 6 carbon atoms to 10 carbon atoms or an aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(2) R2 and $R_3$ form a fused aromatic ring of from 6 carbon atoms to 10 carbon atoms or an aliphatic ring of from 4 carbon atoms to about 8 carbon atoms, and $R_1$ and $R_4$ are independently an alkyl containing one carbon atom to about 20 carbon atoms; or
(3) both $R_1$ and $R_2$ and $R_3$ and $R_4$, taken in pairs, independently form a fused aromatic ring of from 6 carbon atoms to 10 carbon atoms or an aliphatic ring of from 4 carbon atoms to about 8 carbon atoms.

3. The method of claim 2, wherein the one or more pyrroles have the following formula:

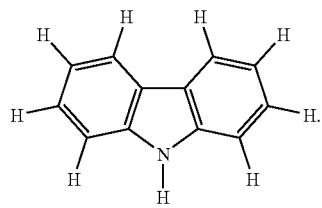

4. The method of claim 2, wherein the ionized polyolefin of step (b) is reacted with one or more imidazoles having at least two hydrocarbyl substituents.

5. The method of claim 4, wherein the one or imidazoles have the following formula:

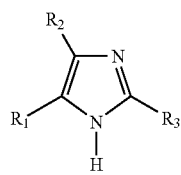

wherein $R_3$ is branched alkyl containing from about 4 carbon atoms to about 20 carbon atoms, and wherein (
a) $R_1$ and $R_2$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms, wherein at least one of $R_1$ or $R_2$ is not hydrogen; or
(b) R1 and $R_2$ form a fused aromatic ring of from 6 carbon atoms to 10 carbon atoms or an aliphatic ring of from 4 carbon atoms to about 8 carbon atoms.

6. The method of claim 5, wherein $R_1$ is methyl, $R_2$ is hydrogen, and $R_3$ is tert-butyl.

7. The method of claim 1, wherein the ionized polyolefin of step (b) is reacted with one or more hindered secondary or tertiary amines of:
formula II:

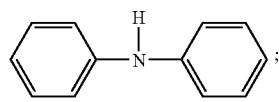

formula III:

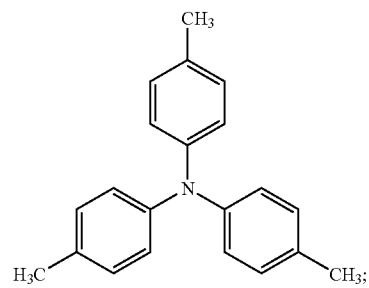

formula IV:

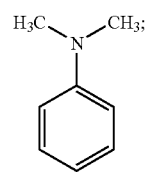

formula V:

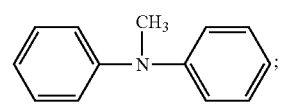

formula VI:

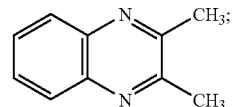

formula VII:

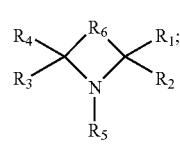

wherein $R_6$ is a divalent hydrocarbyl group of one carbon atom to about 4 carbon atoms, which may be substituted with an alkyl group having one carbon atom to about 6 carbon atoms, and $R_1$, $R_2$, $R_3$, $R_4$, and $R_5$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons; provided that if $R_1$, $R_2$, $R_3$, and $R_4$ are hydrogen, then $R_5$ is a branched alkyl having from about 4 to about 20 carbon atoms, aryl of about 6 to about 30 carbon atoms, or aralkyl of about 7 to about 30 carbon atoms, and provided that if $R_5$ is hydrogen, then $R_1$, R₂, R₃, and R₄ cannot be hydrogen unless either R₁ or R₂ and either R₃ or R₄ is a branched alkyl from about 4 to about 20 carbon atoms;

formula VIII:

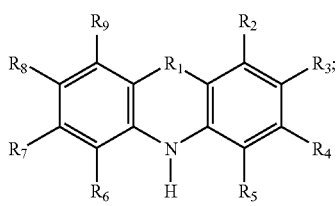

wherein R₁ is a divalent hydrocarbyl group of one carbon atom to about 4 carbons, and R₂, R₃, R₄, R₇, R₈, and R₉ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons, and one of R₅ and R₆ is hydrogen and the other is linear alkyl from one carbon atom to about 20 carbon atoms;

formula IX:

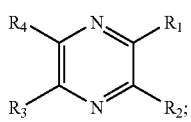

wherein one of R₁ and R₄ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, one of R₂ and R₃ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of R₁ and R₂ and R₃ and R₄, taken in pairs, independently form a fused aromatic ring of from 5 carbon atoms to 7 carbon atoms or aliphatic ring of from about 4 carbon atoms to about 8 carbon atoms;

formula X:

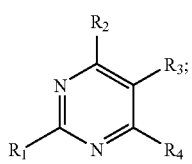

wherein R₁, R, and R₄ are independently hydrogen or alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, R₃ is hydrogen, alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of R₂ and R₃ or R₃ and R₄, taken in pairs, independently form a fused aromatic ring of from 5 carbon atoms to 7 carbon atoms or aliphatic ring of from about 4 carbon atoms to about 8 carbon atoms, provided that if R₁ is hydrogen, then R₂ and R₄ are independently alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and further provided that if R₂ or R₄ is hydrogen, then R₁ is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms;

or formula XI:

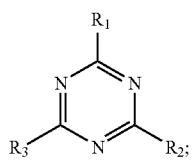

wherein R₁, R₂ and R₃ are independently hydrogen or alkyl of one carbon to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms.

8. The method of claim 7, wherein the one or more hindered secondary or tertiary amines are a compound of formula II:

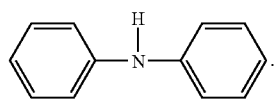

9. The method of claim 7, wherein the one or more hindered secondary or tertiary amines are a compound of formula III:

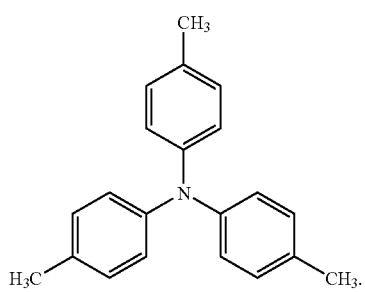

10. The method of claim 7, wherein the one or more hindered secondary or tertiary amines are a compound of formula IV:

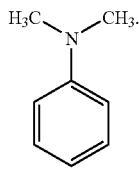

11. The method of claim 7, wherein the one or more hindered secondary or tertiary amines are a compound of formula V:

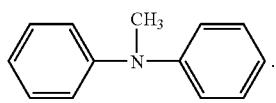

12. The method of claim 7, wherein the one or more hindered secondary or tertiary amines are a compound of formula VI:

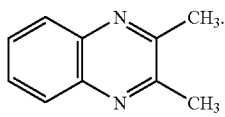

13. The method of claim 7, wherein the one or more hindered secondary or tertiary amines are a compound of formula VII:

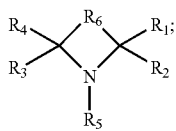

wherein $R_6$ is a divalent hydrocarbyl group of one carbon atom to about 4 carbon atoms, each of which may be substituted with an alkyl group having one carbon atom to about 6 carbon atoms, and $R_1$, $R_2$, $R_3$, $R_4$, and $R_5$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons; provided that if $R_1$, $R_2$, $R_3$, and $R_4$ are hydrogen, then $R_5$ is a branched alkyl having from about 4 to about 20 carbon atoms, aryl of about 6 to about 30 carbon atoms, or aralkyl of about 7 to about 30 carbon atoms, and provided that if $R_5$ is hydrogen, then $R_1$, $R_2$, $R_3$, and $R_4$ cannot be hydrogen unless either $R_1$ or $R_2$ and either $R_3$ or $R_4$ is a branched alkyl from about 4 to about 20 carbon atoms.

14. The method of claim 13, wherein the one or more hindered secondary or tertiary amines have the following formula:

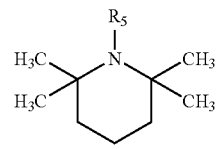

wherein $R_5$ is hydrogen or methyl.

15. The method of claim 13, wherein the one or more hindered secondary or tertiary amines have the following formula:

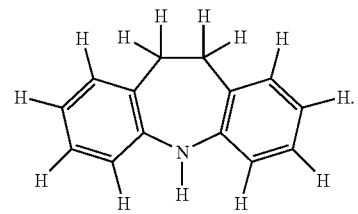

16. The method of claim 7, wherein the one or more hindered secondary or tertiary amines are a compound of formula VIII:

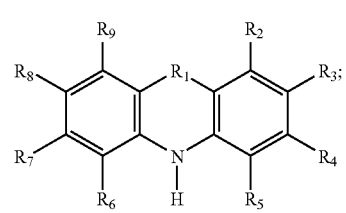

wherein $R_1$ is a divalent hydrocarbyl group of one carbon atom to about 4 carbons, and $R_2$, $R_3$, $R_4$, $R_7$, $R_8$, and $R_9$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons, and one of $R_5$ and $R_6$ is hydrogen and the other is linear alkyl from one carbon atom to about 20 carbon atoms.

17. The method of claim 16, wherein one of $R_5$ and $R_6$ is hydrogen.

18. The method of claim 7, wherein the one or more hindered secondary or tertiary amines are a compound of:
formula IX:

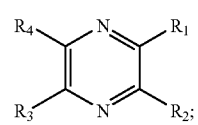

wherein one of $R_1$ and $R_4$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, one of $R_2$ and $R_3$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$ and $R_3$ and $R_4$, taken in pairs, independently form a fused aromatic ring of from 5 carbon atoms to 7 carbon atoms or aliphatic ring of from about 4 carbon atoms to about 8 carbon atoms;

formula X:

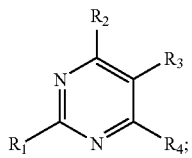

X wherein $R_1$, $R_2$ and $R_4$ are independently hydrogen or alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, $R_3$ is hydrogen, alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_2$ and $R_3$ or $R_3$ and $R_4$, taken in pairs, independently form a fused aromatic ring of from 5 carbon atoms to 7 carbon atoms or aliphatic ring of from about 4 carbon atoms to about 8 carbon atoms, provided that if $R_1$ is hydrogen, then $R_2$ and $R_4$ are independently alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and further provided that if $R_2$ or $R_4$ is hydrogen, then $R_1$ is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms;

or
formula XI:

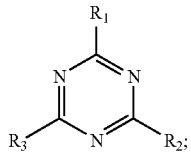

XI wherein $R_1$, $R_2$ and $R_3$ are independently hydrogen or alkyl of one carbon to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms.

19. The method of claim 18, wherein the one or more hindered secondary or tertiary amines have the following formula:

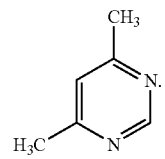

20. The method of claim 18, wherein the one or more hindered secondary or tertiary amines have the following formula:

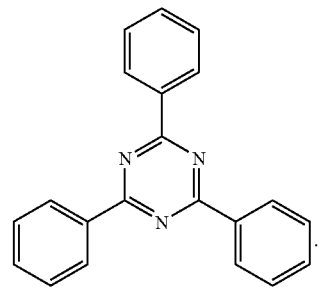 [SMILES: c1ccc(-c2nc(-c3ccccc3)nc(-c3ccccc3)n2)cc1]

21. The method of claim 1, wherein steps (a) and (b) are independently carried out at a temperature in the range of about -130° C. to about 10° C.

22. The method of claim 1, wherein steps (a) and (b) are independently carried out at a temperature in the range of about -80° C. to about 0° C.

23. The method of claim 1, wherein steps (a) and (b) are independently carried out at a temperature in the range of about -70° C. to about -10° C.

24. The method of claim 1, wherein steps (a) and (b) are independently carried out at a temperature in the range of about -60° C. to about -20° C.

25. The method of claim 1, wherein in step (a) the Lewis acid is a halide of titanium or boron.

26. The method of claim 1, wherein in step (a) the Lewis acid is a titanium halide.

27. The method of claim 1, wherein in step (a) the Lewis acid is titanium tetrachloride.

28. The method of claim 1, wherein the polyolefin is polyisobutylene.

29. The method of claim 1, wherein the exo-olefinic end group on the polyolefin product is present in the range of one percent to about 100 percent of the total end groups.

30. The method of claim 1, wherein the polyolefin product has at least 3 percent exo-olefin end groups.

31. The method of claim 1, wherein the polyolefin product has at least 20 percent exo-olefin end groups.

32. The method of claim 1, wherein the polyolefin product has at least 50 percent exo-olefin end groups.

33. The method of claim 1, wherein the polyolefin product has at least 70 percent exo-olefin end groups.

34. A method for preparing a polyolefin product containing exo-olefinic end groups on the polymer chain, comprising:

(a) ionizing a polyolefin containing terminal tert-chloride chain ends on the polymer chain in the presence of a Lewis acid to form an ionized polyolefin; and (b) reacting the ionized polyolefin with:
(i) one or more pyrroles of formula I

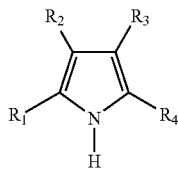

I wherein:
(1) R1 and $R_2$ form a fused aromatic ring of from 6 carbon atoms to 10 carbon atoms or an aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(2) R2 and $R_3$ form a fused aromatic ring of from 6 carbon atoms to 10 carbon atoms or an aliphatic ring of from 4 carbon atoms to about 8 carbon atoms, and $R_1$ and $R_4$ are independently an alkyl containing one carbon atom to about 20 carbon atoms; or
(3) both $R_1$ and $R_2$, and $R_3$ and $R_4$, taken in pairs, independently form a fused aromatic ring of from 6 carbon atoms to 10 carbon atoms or an aliphatic ring of from 4 carbon atoms to about 8 carbon atoms;
(ii) one or more imidazoles having at least two hydrocarbyl substituents, provided that the one or more imidazoles are not
(1) 2-methylbenzimidazole;
(2) 1,2-dimethylimidazole;
(3) 2-phenylimidazole; and
(4) 2,4,5-triphenylimidazole; or
(iii) one or more hindered secondary or tertiary amines of:
formula II:

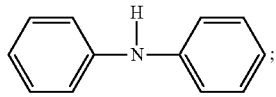

II formula III:

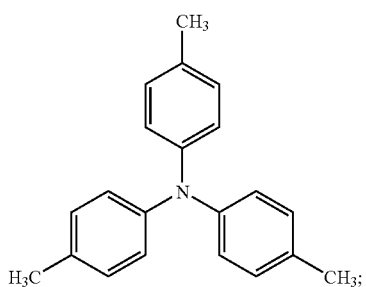

III formula IV:

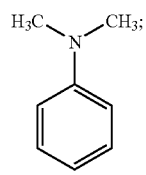

IV formula V:

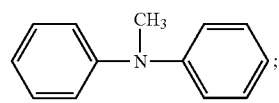

V formula VI:

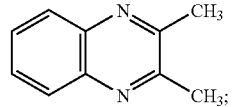

VI formula VII:

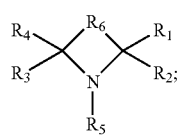

VII wherein $R_6$ is a divalent hydrocarbyl group of one carbon atom to about 4 carbon atoms, which may be substituted with an alkyl group having one carbon atom to about 6 carbon atoms, and $R_1$, $R_2$, $R_3$, $R_4$, and $R_5$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons; provided that if $R_1$, $R_2$, $R_3$, and $R_4$ are hydrogen, then $R_5$ is a branched alkyl having from about 4 to about 20 carbon atoms, aryl of about 6 to about 30 carbon atoms, or aralkyl of about 7 to about 30 carbon atoms, and provided that if $R_5$ is hydrogen, then $R_1$, $R_2$, $R_3$, and $R_4$ cannot be hydrogen unless either $R_1$ or $R_2$ and either $R_3$ or $R_4$ is a branched alkyl from about 4 to about 20 carbon atoms;
formula VIII

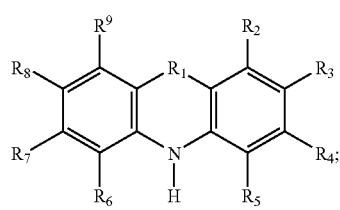

VIII wherein $R_1$ is a divalent hydrocarbyl group of one carbon atom to about 4 carbons, and R7, $R_3$, $R_4$, $R_7$, $R_8$, and $R_9$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons, and one of $R_5$ and $R_6$ is hydrogen and the other is linear alkyl from one carbon atom to about 20 carbon atoms;

formula IX:

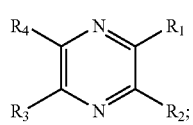

IX wherein one of $R_1$ and $R_4$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, one of $R_2$ and $R_3$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$ and $R_3$ and $R_4$, taken in pairs, independently form a fused aromatic ring of from 5 carbon atoms to 7 carbon atoms or aliphatic ring of from about 4 carbon atoms to about 8 carbon atoms;

formula X:

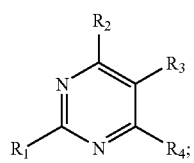

X wherein $R_1$, $R_2$ and $R_4$ are independently hydrogen or alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, $R_3$ is hydrogen, alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_2$ and $R_3$ or $R_3$ and $R_4$, taken in pairs, independently form a fused aromatic ring of from 5 carbon atoms to 7 carbon atoms or aliphatic ring of from about 4 carbon atoms to about 8 carbon atoms, provided that if $R_1$ is hydrogen, then $R_2$ and $R_4$ are independently alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and further provided that if $R_2$ or $R_4$ is hydrogen, then $R_1$ is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms;

or formula XI:

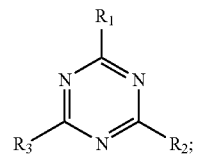

XI wherein $R_1$, $R_2$ and $R_3$ are independently hydrogen or alkyl of one carbon to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms;

wherein the one or more pyrroles, imidazoles, or hindered secondary or tertiary amines are pre-reacted with a Lewis acid.

35. The method of claim 34, wherein the Lewis acid is titanium tetrachloride and the substituted pyrrole is 2,3-dimethyl indole.

36. The method of claim 34, wherein the Lewis acid is titanium tetrachloride and the hindered amine is 1,2,2,6,6-pentamethylpiperidine.

37. The method of claim 34, wherein the Lewis acid is titanium tetrachloride.

* * * * *